F. R. BONN.
DRINK MIXER.
APPLICATION FILED JAN. 11, 1912.
1,056,882.
Patented Mar. 25, 1913.
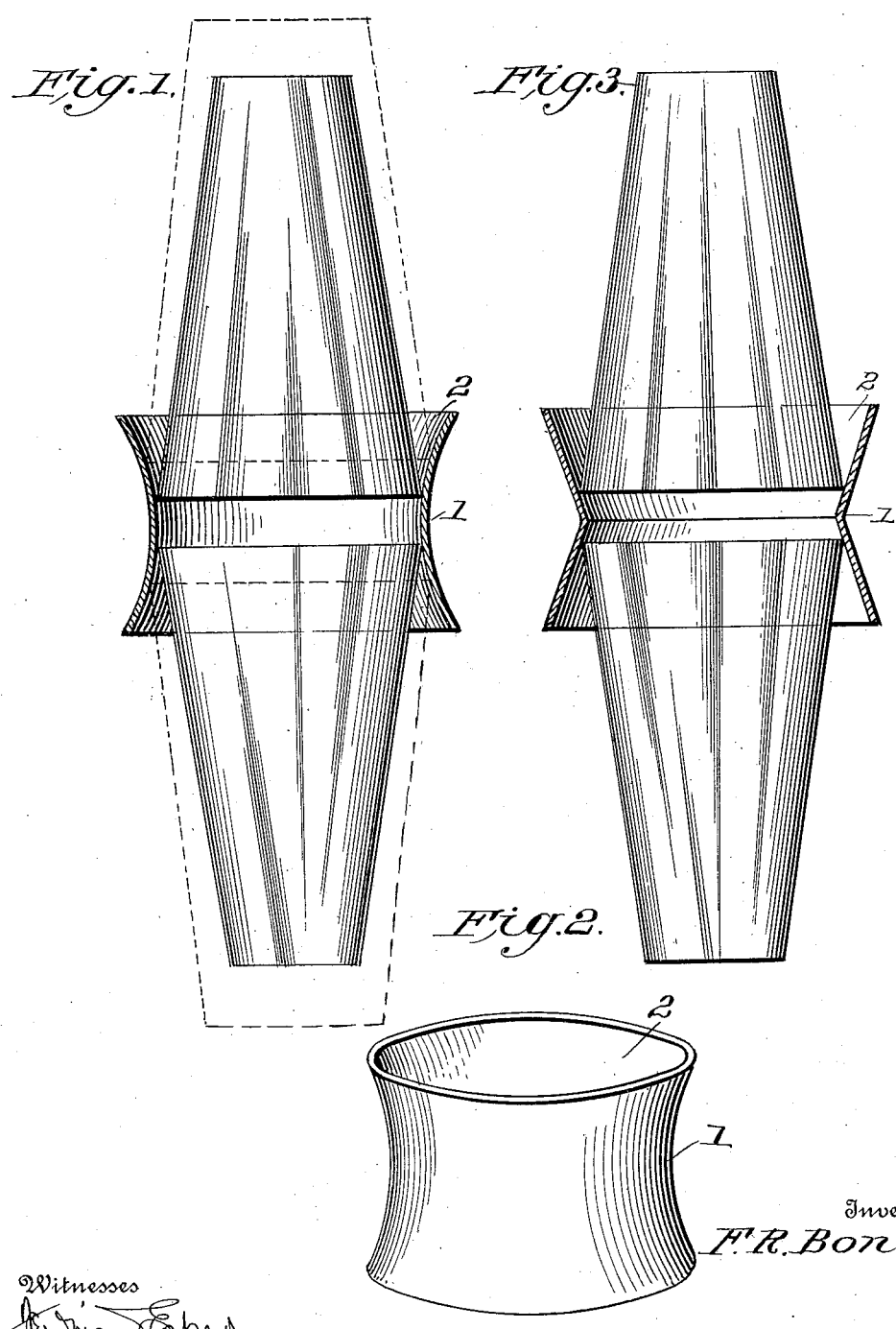

UNITED STATES PATENT OFFICE.

FRANK R. BONN, OF SALT LAKE CITY, UTAH, ASSIGNOR OF THREE-TENTHS TO BENJAMIN D. HAMILL AND THREE-TENTHS TO EDWARD C. PARSONS, BOTH OF SALT LAKE CITY, UTAH.

DRINK-MIXER.

1,056,882.  Specification of Letters Patent.  Patented Mar. 25, 1913.

Application filed January 11, 1912. Serial No. 670,678.

*To all whom it may concern:*

Be it known that I, FRANK R. BONN, a citizen of the United States, residing at Salt Lake City, in the county of Salt Lake and State of Utah, have invented certain new and useful Improvements in Drink-Mixers, of which the following is a specification.

This invention relates to drink mixers, and has as its object to provide a substitute for the ordinary metallic conical mixer. It is well known that such mixers require to be kept scrupulously clean, and that even when this is done, their tin lining is soon eaten away by the acids in fruit juices, so as to expose the copper upon which the fruit juices act to form verdigris. Another disadvantage possessed by such a mixer is that when separated from the mixing glass a greater or less quantity of the mixture is spilled, especially if the mixture contains milk or other ingredients liable to foam.

The present invention therefore aims to provide a device for this purpose, which will not contaminate the drink being mixed, and which may be manufactured of block tin or other metal not liable to tarnish or be affected by the ingredients of the drink, at a cost if anything less than the cost of the ordinary metallic mixer above referred to.

It is a further aim of the invention to provide a mixer so constructed as to connect in a liquid tight manner the mouths of the two mixing glasses. In this manner, the drink being mixed is in plain view of the customer, and comes in contact with but a very small area of metal surface.

A further advantage possessed by a mixer constructed in accordance with this invention is that it may be thoroughly cleaned and all parts thereof may be reached, there being no angles or corners in which matter of any sort might lodge.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawing, in which:

Figure 1 is a vertical transverse sectional view through one form of the mixer embodying the present invention; Fig. 2 is a perspective view of this form of mixer, and Fig. 3 is a view similar to Fig. 1, illustrating a slight modification of the invention.

Corresponding and like parts are referred to in the following description and indicated in all the views of the drawing by the same reference characters.

The mixers of both forms of the invention are of annular form and are arranged to receive, from opposite ends, the mouths of two mixing glasses. The mixer as shown in Figs. 1 and 2 is indicated in general by the reference numeral 1 and is preferably spun or otherwise formed from block tin or other metal not liable to become tarnished or be affected by acids, and is of annular form and has its inner surface 2 transversely convex and perfectly smooth. So far as the actual operation of the mixer is concerned, it may be exteriorly of any desired form, although preferably in order to render it light and cheaper to manufacture, its exterior surface is transversely concave, as shown in the said figure. In any event, the inner surface of the mixer is perfectly smooth and unbroken, and is also preferably convex on a regular curve. By giving the interior of the mixer the contour stated, it is formed interiorly of less diameter at its middle than at either end.

The mixer shown in Fig. 3 is substantially of the form of that shown in Figs. 1 and 2, the only difference being that while the inner surface of the mixer is transversely convex, the said inner surface is not convex on a curve, but on straight lines. In other words, the mixer shown in Fig. 3 is in the form of an annular body interiorly flared in the direction of each end or side.

In using either form of mixer, two mixing glasses are fitted into the opposite ends thereof in the manner illustrated in Figs. 1 and 3, and the mixer serves to connect them in a liquid tight manner. It will be observed from the dotted line illustration in Fig. 1 that glasses of different sizes may be connected by the mixer.

As before stated, the mixer is flared in the direction of each end, and is preferably formed from block tin or some other similar metal which, in addition to the properties before mentioned, is more or less pliable, so that the rims of the mixing glasses will more snugly fit against the inner surface of the mixer than if the mixer was formed of some metal not possessing this property.

As before stated, in using the ordinary metallic conical mixer, when the mixer is separated from the mixing glass, more or less of the drink being mixed is liable to be spilled upon the bar, due to the fact that such mixers are ordinarily of the same capacity as the mixing glass itself, and any increase in volume of the drink being mixed due to the formation of foam, will cause the drink to overflow when the mixer is separated from the glass.

It will furthermore be understood from the foregoing description that, if desired, the device and one mixing tumbler or glass may always be left engaged and ready for service. Also, it will be apparent that inasmuch as the device is relatively short, the inserted ends of the two tumblers and the device may be grasped in one hand when mixing a drink.

Having thus described the invention, what is claimed is:

1. A device of the class described comprising an annular body of a length to receive the mouth of a glass or like receptacle in either of its ends, the said body having its wall of anticlastic form in cross-section, the inner surface of the body being continuously convex from end to end of the body.

2. A device of the class described comprising an annular body of a length to receive the mouth of a glass or like receptacle in either of its ends, the said body having its wall of anticlastic form in cross-section, the inner surface of the body being continuously convex from end to end of the body, the said inner surface of the body being free from projections at all points in its area.

In testimony whereof, I affix my signature in presence of two witnesses.

FRANK R. BONN. [L. S.]

Witnesses:
 MARGARET FISHER,
 E. C. PARSONS.

Copies of this patent may be obtained for five cents each, by addressing the "Commissioner of Patents, Washington, D. C."